United States Patent
Kawamura et al.

(10) Patent No.: US 6,818,691 B2
(45) Date of Patent: Nov. 16, 2004

(54) NON-DRYING SEALER COMPOSITION (75) Inventors: Masato Kawamura, Aichi-ken (JP); Akira Mabuchi, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 401 days.

(21) Appl. No.: 09/953,238

(22) Filed: Sep. 17, 2001

(65) Prior Publication Data

US 2002/0061952 A1 May 23, 2002

(30) Foreign Application Priority Data

Sep. 26, 2000 (JP) ........................................ 2000-293096

(51) Int. Cl.⁷ ................................................. C08K 3/26
(52) U.S. Cl. ........................ 524/425; 524/306; 524/376
(58) Field of Search ................................ 524/425, 306, 524/376

(56) References Cited

U.S. PATENT DOCUMENTS 6,187,850 B1   2/2001   Kawamura et al.

FOREIGN PATENT DOCUMENTS

JP   2000-80347   3/2000

*Primary Examiner*—Edward J. Cain
(74) *Attorney, Agent, or Firm*—Posz & Bethards, PLC (57) ABSTRACT

The present invention provides a non-drying sealer composition which does not substantially swell or shrink non-polar vulcanized rubber products. The non-drying sealer composition is suitable for sealing a gap between a sheet-metal flange and the inside of a trim part by charging the composition into the trim part of the weatherstrip for an automobile. The non-drying sealer composition comprises liquid rubber as a sealer base, a tackifier and a thixotropic agent as auxiliary materials, and a non-volatile softener (including a plasticizer) as a dispersing medium. As the non-volatile softer, a shrinking component is used alone or in combination with a swelling component. Thus the swelling action of the sealer composition against the non-polar vulcanized rubber product reaches within about ±5% in terms of the degree of swelling.

10 Claims, 10 Drawing Sheets

NON-DRYING SEALER COMPOSITION

CROSS-REFERENCE TO RELATED APPLICATION

This application claims priority from Japanese patent application No. 2000-293096, filed on Sep. 26, 2000, the complete disclosure of which is hereby incorporated into the patent application by this reference.

BACKGROUND OF THE INVENTION

The present invention relates to a novel non-drying sealer composition and a process for preparing the same. In particular, the present invention relates to a non-drying sealer composition which is suitable for sealing a gap between a sheet-metal flange and the inside of a trim part by charging the composition into the inside of the trim part of a weatherstrip for an automobile.

The non-drying sealer composition of the present invention will be described by reference to a trunk lid weatherstrip, but can be applied to other weatherstrips for lift gate etc. and to a gap between sheet metals or between a sheet metal and a rubber member.

The general mode of fitting the non-drying sealer is described by reference to the application thereof to a trunk lid weatherstrip (see FIGS. 1 and 2).

Figure 1:
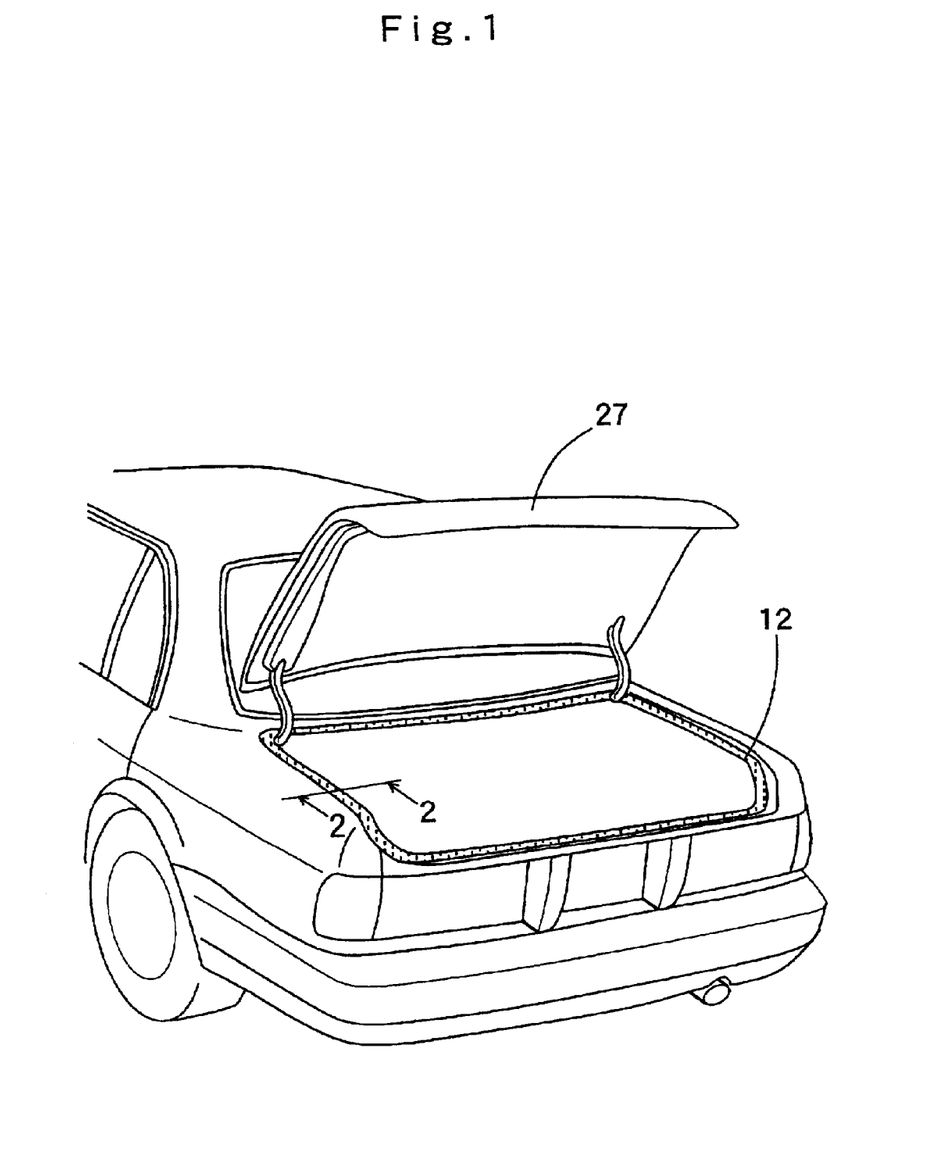
FIG. 1 is a perspective view of the rear of an automobile, which shows an attachment site of a trunk lid weatherstrip as one example of weatherstrip to which the sealer of the present invention is applied.
Figure 2:
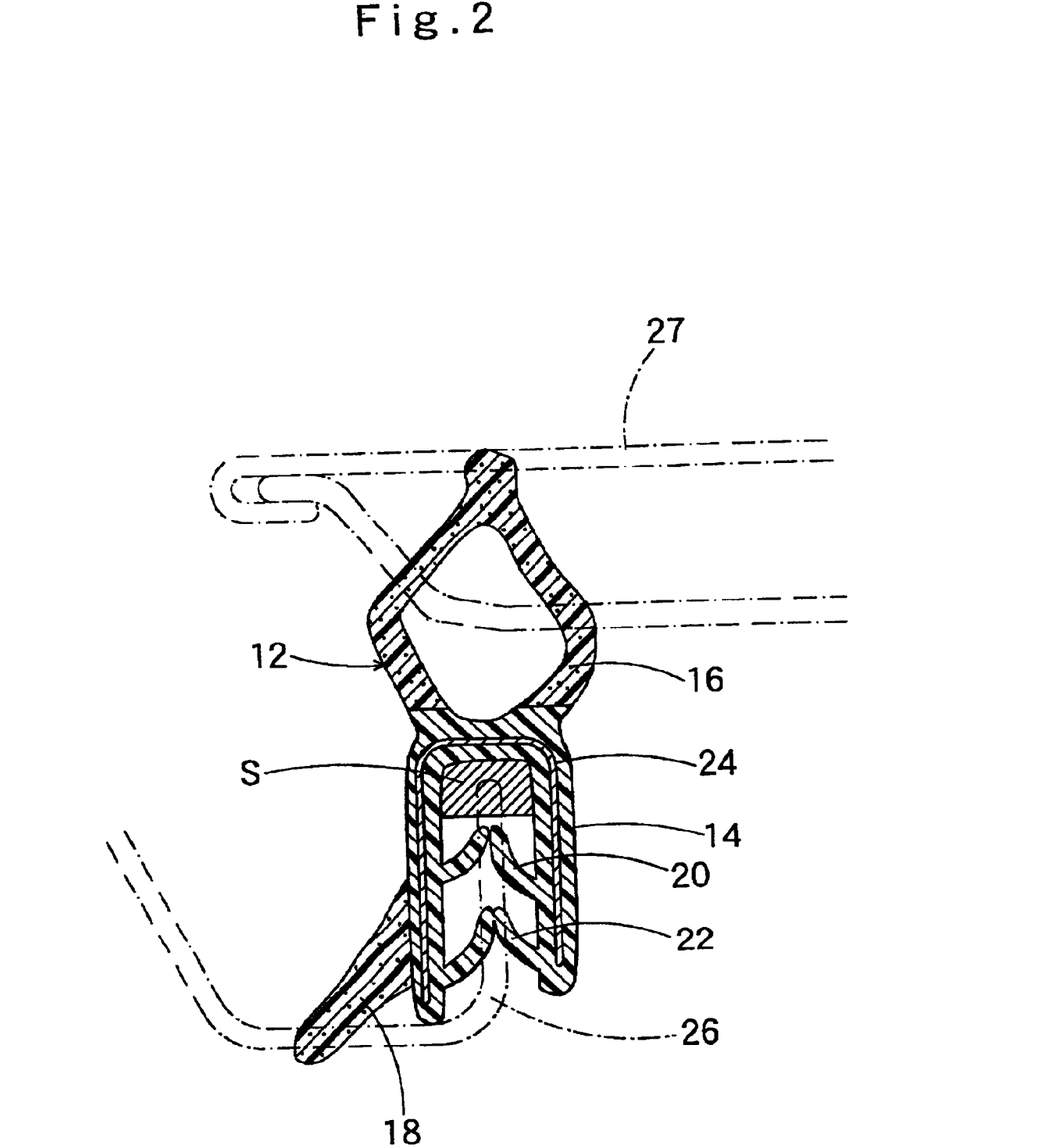
FIG. 2 is a sectional view (along line 2—2 in FIG. 1) of the weatherstrip filled with the sealer.

FIG. 2 is a sectional view of the fit members along line 2—2 in FIG. 1. The weatherstrip 12 is composed of a trim part 14, a hollow sealing part 16 and a sealing lip 18. The trim part 14 is provided with a pair of sandwiching lips 20 and 22 therein and a sheet-metal insert 24 embedded therein for maintaining the shape and sandwiching force thereof.

Sealer S is charged into the grooved bottom of the trim part 14, and via the trim part 14, the weatherstrip 12 is attached to the sheet-metal flange 26 in a trunk. As a result, the sheet-metal flange 26 is inserted into sealer S. In FIG. 2, 27 (chain line) is a trunk lid.

The sealer improves the rust prevention of the sheet-metal flange and the sealing properties of the weatherstrip trim.

As a conventional sealer to be used in such sites, there was the one having a composition shown in e.g. the Reference Example in Table 1.

For the type of sealer shown in Table 1, however, an organic solvent (e.g. kerosine) is essential for dissolving butyl rubber in order to regulate the viscosity in a suitable range.

The organic solvent is generally toxic and highly volatile to cause the following problems.

① Attention should be paid to maintenance of the working atmosphere during production and application of the sealer, and from the viewpoint of global environmental protection, the discharge (through vaporization) of the solvent to the outside should be prevented as much as possible.

② For fitting of the sealer, the sealer just after preparation strings highly and thus easily adheres to other parts, thus deteriorating the processability for fitting the sealer, and because of the sagging and running properties of the sealer, a weatherstrip charged with the sealer cannot be turned over in order to attach a sheet-metal flange thereto. On the other hand, the organic solvent is evaporated with time after charging of the sealer to increase the viscosity of the sealer, thus causing the increasing loading upon insertion of sheet metal into the sealer and adversely affecting the processability of fitting the weatherstrip.

Accordingly, the present inventors proposed a non-drying sealer composition which in the absence of an organic solvent, can achieve sealing properties equal to or higher than those of the conventional one (see JP-A 2000-80347), as follows.

"A non-drying sealer composition comprising liquid rubber as a sealer base, a tackifier and a thixotropic agent as auxiliary materials, and a non-volatile softener or process oil as a dispersing medium."

However, the liquid rubber and dispersing medium contained in the non-drying composition described above will swell non-polar vulcanized rubber products such as ethylene propylene-based vulcanized rubber products (vulcanized EPDM rubber products). Accordingly, when the non-drying sealer composition is applied to a weatherstrip made of vulcanized EPDM rubber, the weatherstrip may be deformed and its strength may be decreased resulting in a deterioration in the sealing properties of the weatherstrip. In particular, when the trim part of the weatherstrip is made insert-less, this tendency appears easily and significantly.

In view of the foregoing, the object of the present invention is to provide a non-drying sealer composition which does not substantially swell or shrink non-polar vulcanized rubber products.

SUMMARY OF THE INVENTION

The sealer composition of the present invention solves the above problem by the following constitution.

The non-drying sealer composition applied to a non-polar vulcanized rubber product comprises liquid rubber as a sealer base, a tackifier and a thixotropic agent as auxiliary materials, and a non-volatile softener (including a plasticizer) as a dispersing medium, wherein as the non-volatile softer, a shrinking component is used alone or in combination with a swelling component, whereby the swelling action of the sealer composition on the non-polar vulcanized rubber product reaches within about ±5% (desirably about 0%) in terms of the degree of swelling.

By constituting the non-drying sealer composition as described above, a product to which the composition has been applied will not swell or shrink, and the product hardly undergo deformation or a reduction in strength. Accordingly, when the composition is applied to a sealing product (e.g. weatherstrip) made of non-polar vulcanized rubber, the deterioration in sealing performance caused by swelling or shrinking of the product hardly occurs.

The shrinking component is preferably a polyether polyol. This is because a polyether polyol having an optimum number of functional groups (OH value) and an optimum molecular weight can be easily obtained from various polyether polyols.

The shrinking component is more preferably a trifunctional polypropylene glycol (PPG). As compared with a bifunctional polyol, the trifunctional PPG has a higher shrinking action and can be selected from a broader range of glycols having various viscosities and molecular weights.

It is preferable in the constitution described above that the liquid rubber is liquid NBR, and the swelling component in the non-volatile softener is a diphthalate-based plasticizer and/or process oil. The diphthalate-based plasticizer and process oil are swelling components, and by combination thereof with a shrinking component such as the above-mentioned polyether polyol e.g. PPG, the swelling action of the sealer composition against the non-polar rubber to which it was applied can easily reaches substantially zero.

As the thixotropic agent, calcium carbonate powder is usually employed. This is because as compared with other thixotropic agents, the calcium carbonate powder is easily available and can easily attain viscosity suitable for charging the sealer composition.

DETAILED DESCRIPTION OF THE PREFERRED EMBODIMENTS

The constitution of each of the above means is described. Hereinafter, the "sealer composition" maybe referred to simply as "sealer".

A. Description of the Sealer Composition (1) Liquid Rubber As a Sealer Base

It is estimated that the sealing action of the sealer is attributable mainly to liquid rubber having rubber elasticity. The liquid rubber refers to the one having a molecular weight of about 2000 to 10000, which is in a liquid form at ordinary temperature. The liquid rubber may have been stabilized by adding functional groups such as —OH, —SH, —NH$_2$, —COOH, —NCO and —Br to both termini of a polymer chain thereof (see page 21 in "New Handbook of Synthetic Rubber, Enlarged Edition" edited by Amane Kanbara et al., published by Asakura Syoten Nov. 30, 1967).

The liquid rubber may be conventional and general-purpose low-molecular liquid butyl rubber, liquid polyisoprene, polybutadiene, 1,2-polybutadiene and polychloroprene, preferably liquid NBR having a molecular weight of 3000 to 10000 with a nitrile content of 15 to 50% (preferably 25 to 30%). This is because for use of the sealer of the present invention in automobiles, the rubber should be oil-resistant and excellent in compatibility with the nonvolatile plasticizer (usually having polarity) used in place of organic solvent (2) A tackifier and a thixotropic agent as auxiliary materials and a nonvolatile plasticizer or process oil as a dispersing medium (matrix)

The tackifier is preferably a combination of liquid tackifier (liquid at ordinary temperature) and resinous tackifier (solid at ordinary temperature). If only the liquid tackifier is used, the sealer is hardly endowed with tackiness on sheet metal, and simultaneously the fluidity of the sealer becomes too high to secure rigidity necessary for the sealer upon gelation. On the other hand, if only the resinous tackifier is used, the amount of the resinous tackifier incorporated is relatively increased, thus making it difficult to dissolve the tackifier in the dispersing medium, and simultaneously the rubber elasticity of the sealer may be suppressed.

The ratio by weight of liquid tackifier/resinous tackifier incorporated is from 2/8 to 7/3, preferably from 3/7 to 6/4.

As the liquid tackifier, it is possible to suitably use liquid polybutene, liquid polybutadiene (molecular weight of 1000 to 4000), special polymerized polyester, liquid polybutadiene, liquid polybutadiene, turpentine-based tackifier and other commercially available special preparations (see pages 139, 140, 142, 143 etc. in "Chemicals Compounded with Rubber and Plastic" edited and published by Rubber Digest Ltd., Oct. 15, 1974).

From the viewpoint of the balance between the ability of the tackifier and the solubility (compatibility) thereof in the plasticizer and for easy availability thereof, liquid polybutene is preferable. Specifically, liquid polybutene having an average molecular weight of 500 to 1500, desirably 900 to 1500, can be preferably used. More specifically, liquid polybutenes commercially available under the trade name "Idemitsu Polybutene 100R (940), 300R (1330)" (whose molecular weight is shown in the brackets) from Idemitsu Petrochemical Co., Ltd. can be preferably used.

As the resinous tackifier, of petroleum resin, chroman indene resin, phenol-formaldehyde type resins, xylene-formaldehyde resin, polyterpene resin, rosin ester etc. can be used. Among these, petroleum resin is preferable. As used herein, the petroleum resin is a thermoplastic resin obtained by cationically polymerizing a mixture of cracked-petroleum fractions in the presence of a catalyst, and the petroleum resin is preferably used as a sealer component because of its relative low viscosity and easy processability.

(3) The nonvolatile softer (including a plasticizer) used as a dispersing medium shall be composed such that the swelling action of the sealer composition on a non-polar vulcanized rubber product (such as EPDM etc.) is limited within about ±5% in terms of the degree of swelling. Usually, the liquid rubber and the liquid tackifier described above exert swelling action on a non-polar vulcanized rubber product, thus necessitating incorporation of a shrinking component into the sealer composition.

Through the process of experiments, the present inventors found for the first time that a shrinking component can be used as the dispersing medium, and also that by using the shrinking component in combination with a swelling component, the degree of swelling can be made about 0%.

The shrinking component is not particularly limited insofar as it belongs to the concept of nonvolatile softener, but usually a polyether polyol can be preferably used. Polyether polyols have a varying number of functional groups (specifically OH values) (number of polar groups) and various molecular weights, and thus an optimum polyether polyol can be easily obtained therefrom.

The shrinking component includes e.g. polypropylene glycol (PPG), polyethylene glycol (PEG), and an ethylene oxide (EO)/propylene oxide (PO) copolymer. These compounds include not only bifunctional one (glycol) but also tri- or more functional ones. The tri- or more functional ones are obtained by addition polymerization of alkylene oxides ($C_{2-6}$, preferably $C_{2-3}$) with tri- or more functional (polyvalent) alcohols such as glycerin, pentaerythritol, sucrose etc. as the starting material.

Specifically, it is possible to use each of polyether polyols having the following characteristics:

| ① PPG (bifunctional): | |
|---|---|
| Viscosity (mPa · s/25° C.) | 100 to 600, |
| Molecular weight | 400 to 3000, |
| OH value | 280 to 40, |
| ② PPG (trifunctional): | |
| Viscosity (mPa · s/25° C.) | 100 to 600, |
| Molecular weight | 400 to 3000, |
| OH value | 280 to 40, |
| ③ PEG (bifunctional): | |
| Viscosity (mPa · s/25° C.) | 50 to 500, |
| Molecular weight | 200 to 600, |
| OH value | 560 to 190, |
| ④ EO/PO copolymer (bifunctional): | |
| Viscosity (mPa · s/25° C.) | 100 to 1000, |
| Molecular weight | 240 to 3750, |
| OH value | 470 to 30. |

Among these compounds, trifunctional PPG is preferable. As compared with bifunctional ones, trifunctional ones have higher shrinking action, and can be selected from a larger number of compounds having various viscosities, molecular weights and OH values.

Figure 3:
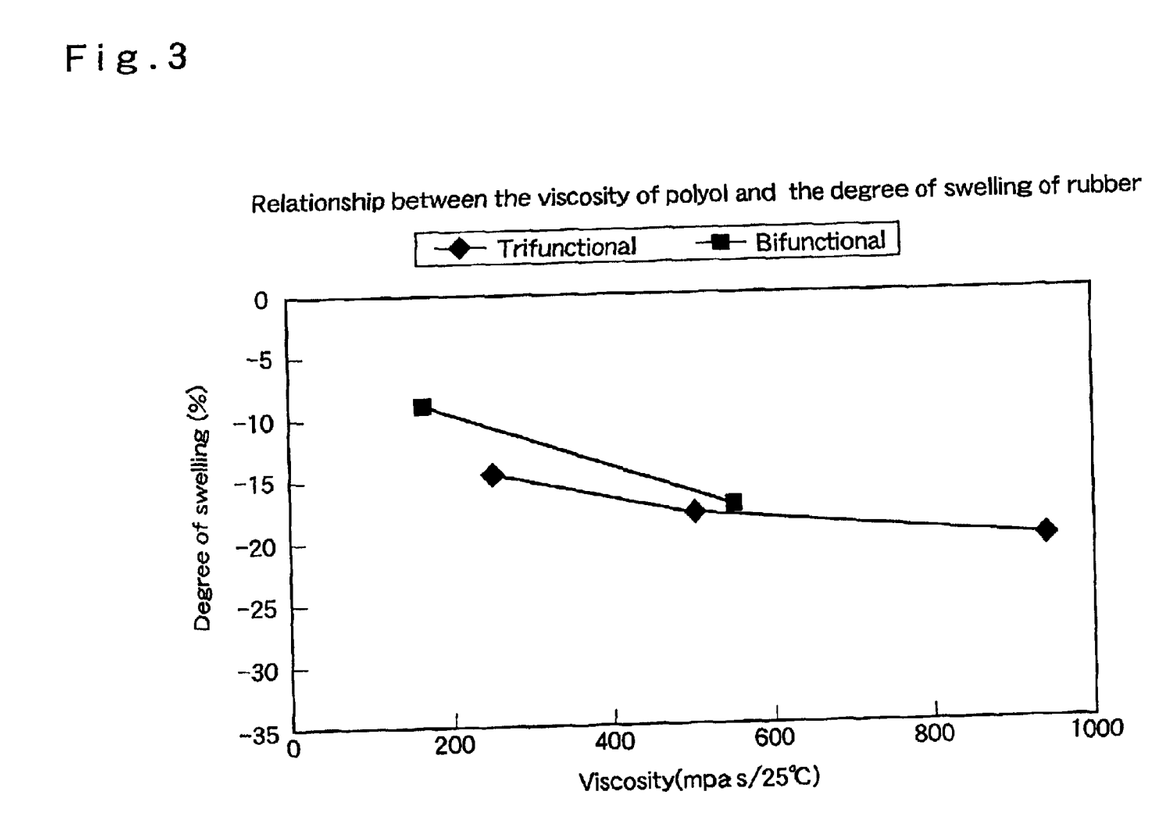
FIG. 3 is a graph showing the relationship between the viscosity of PPG and the degree of swelling of a vulcanized rubber product.
Figure 4:
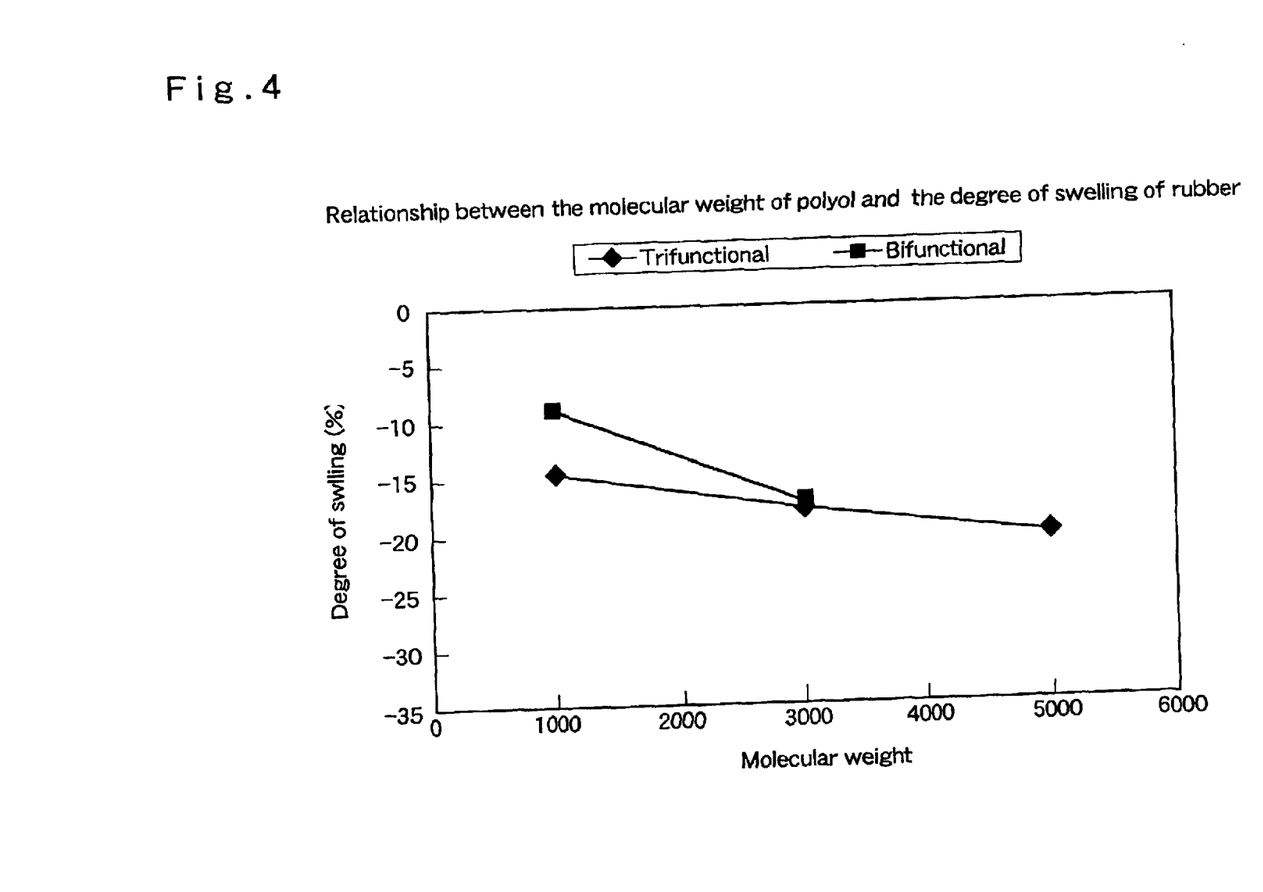
FIG. 4 is a graph showing the relationship between the molecular weight of PPG and the degree of swelling of a vulcanized rubber product.
Figure 5:
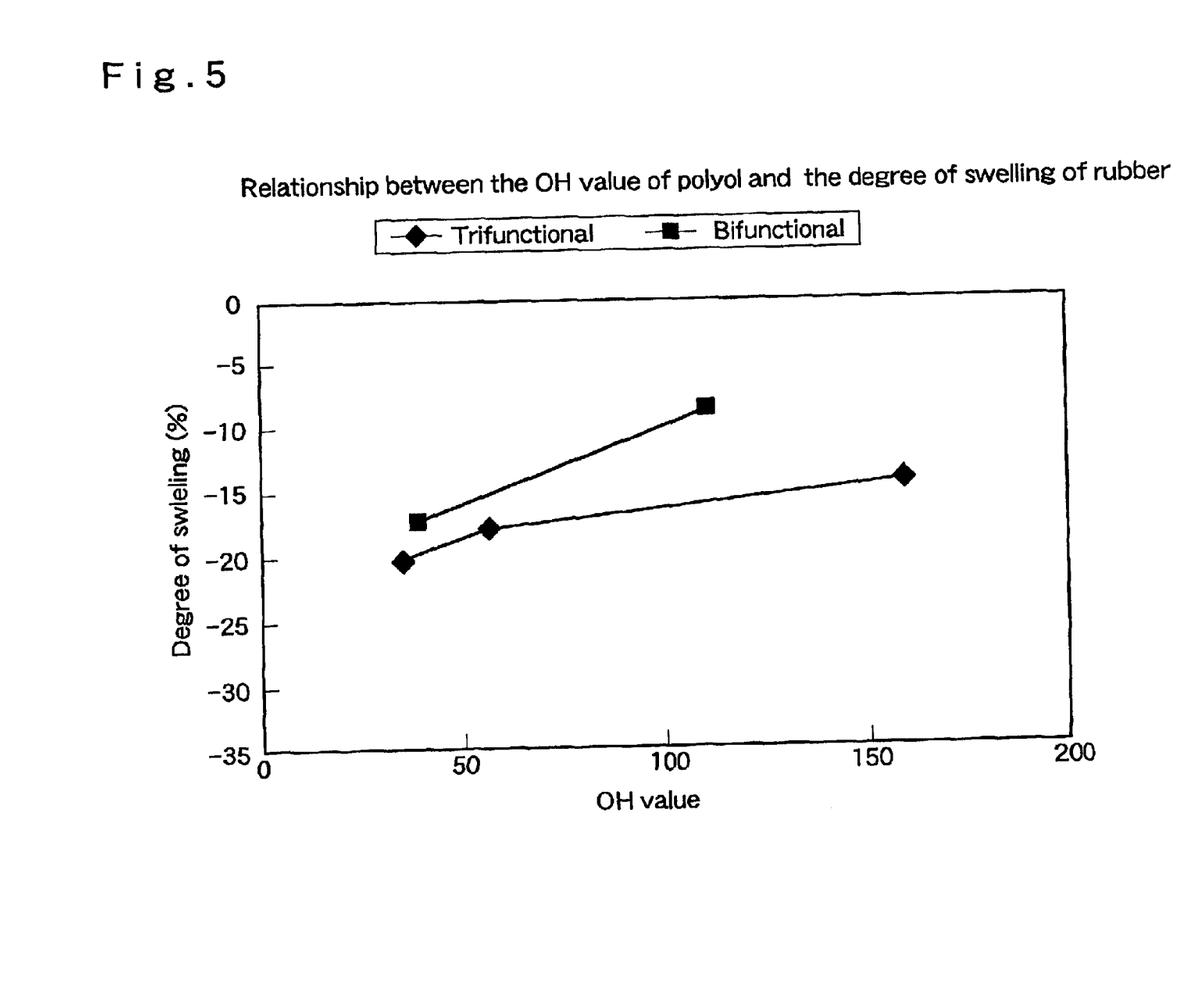
FIG. 5 is a graph showing the relationship between the OH value of PPG and the degree of swelling of a vulcanized rubber product.

This is supported by FIGS. 3, 4 and 5 showing experimental results where a composition containing trifunctional or bifunctional PPG was used to examine the relationship among viscosity, molecular weight, OH value and shrinking action (degree of swelling) after dipping at 70° C.×24 hrs.

There is no problem if by using the polyether polyol only, the swelling action can approximately equilibrate the shrinking action such that the degree of swelling is made within about ±5%, preferably about 0%. For higher shrinking action for reducing the degree of swelling to particularly 0% or thereabout, it is preferable that the dispersing medium used in the publication supra is used in combination with the polyether polyol. By doing so, the viscosity of the sealer can also be easily regulated as described later.

The swelling component in the non-volatile softener (dispersing medium) is not particularly limited insofar as it is non-volatile and compatible or miscible with the liquid rubber and auxiliary materials described above.

For example, plasticizers based on aromatic dicarboxylates or aromatic dibasic acid esters, or epoxy plasticizers can be used. Among these compounds, aromatic dicarboxylates, for example diphthalates with $C_{7-12}$ higher alcohols, are preferably used because of their easy availability, and those with branched higher alcohols are used more preferably.

As the number of carbon atoms in these compounds is decreased, there may easily occur a deficiency in volatilization resistance, cold resistance, water resistance etc., whereas as the number of carbon atoms is increased, there may easily occur a deficiency in compatibility with liquid rubber etc. For higher oil resistance and transfer resistance, it is preferable that higher alcohols used in the diphthalates are branched as described above.

Specifically, di-2-ethylhexyl phthalate (DOP), di-n-octyl phthalate, dinonyl phthalate, diisononyl phthalate (DINP), diiusodecyl phthalate, diundecyl phthalate etc. can be preferably used.

Together with or instead of the plasticizer (particularly the one based on diphthalate), process oil can be used as the swelling component. As with the plasticizer, the process oil is not particularly limited insofar it is compatible or miscible with the liquid rubber and auxiliary materials, and the process oil may be any type of paraffin, naphthene or aroma, which is usually compounded with rubber. Among these, paraffin-type process oil is preferable owing to excellent wetting properties (draping properties) on EPDM as the weatherstrip material.

The ratio of the shrinking component (trifunctional PPG)/ swelling component compounded in the fundamental composition is as follows. As a matter of course, the ratio will be varied depending on the swelling action/shrinking action (power factor) of each component.

Diphthalate/PPG=10/90 to 20/80 (preferably 15/85 or thereabout)

Process oil/PPG=15/80 to 25/75 (preferably 20/80)

(4) The thixotropic agent improves the processability of fitting the sealer to the grooved bottom of the trim part and the processability of fitting the fit sealer to a sheet-metal flange, and also permits the sealer in a stationary state to be gelled and non-fluidized.

Usually, the thixotropic agent is not particularly limited insofar as it has an ability to form a structure by cohesive force. The thixotropic agent may be made of organic or inorganic fine particles, and from the viewpoint of heat resistance and gelling strength, it is preferable that the thixotropic agent is made of inorganic fine particles having surface activity. As the inorganic fine particles, heavy calcium carbonate, fine calcium carbonate particles, carbon black, silica powder (white carbon), talc etc., whose particle diameter is 0.05 to 3 μm, can be used. In particular, calcium carbonate-type particles are preferable. Carbon black, silica powder etc. cause high viscosity and may adversely affect fitting properties.

(5) The proportion of the respective components to be compounded is not particularly limited within such a range as to achieve characteristics required of the sealer (wetting properties and plasticizing properties on sheet metal, necessary rubber elasticity, heat resistance, rigidity for retaining a predetermined shape, etc.), and usually the respective components are compounded in the following ratio:

Liquid rubber: 2 to 8 wt % (preferably 4 to 6 wt %)

Tackifier: 10 to 30 wt % (preferably 15 to 25 wt %)

Liquid tackifier/resinous tackifier=3/7 to 7/3 (preferably 4/6 to 6/4)

Dispersing medium (polyether polyol, plasticizer or process oil):

10 to 30 wt % (preferably 15 to 25 wt %)

Thixotropic agent:

40 to 70 wt % (preferably 50 to 60 wt %)

B. Preparation of the Sealer Composition

Figure 6:
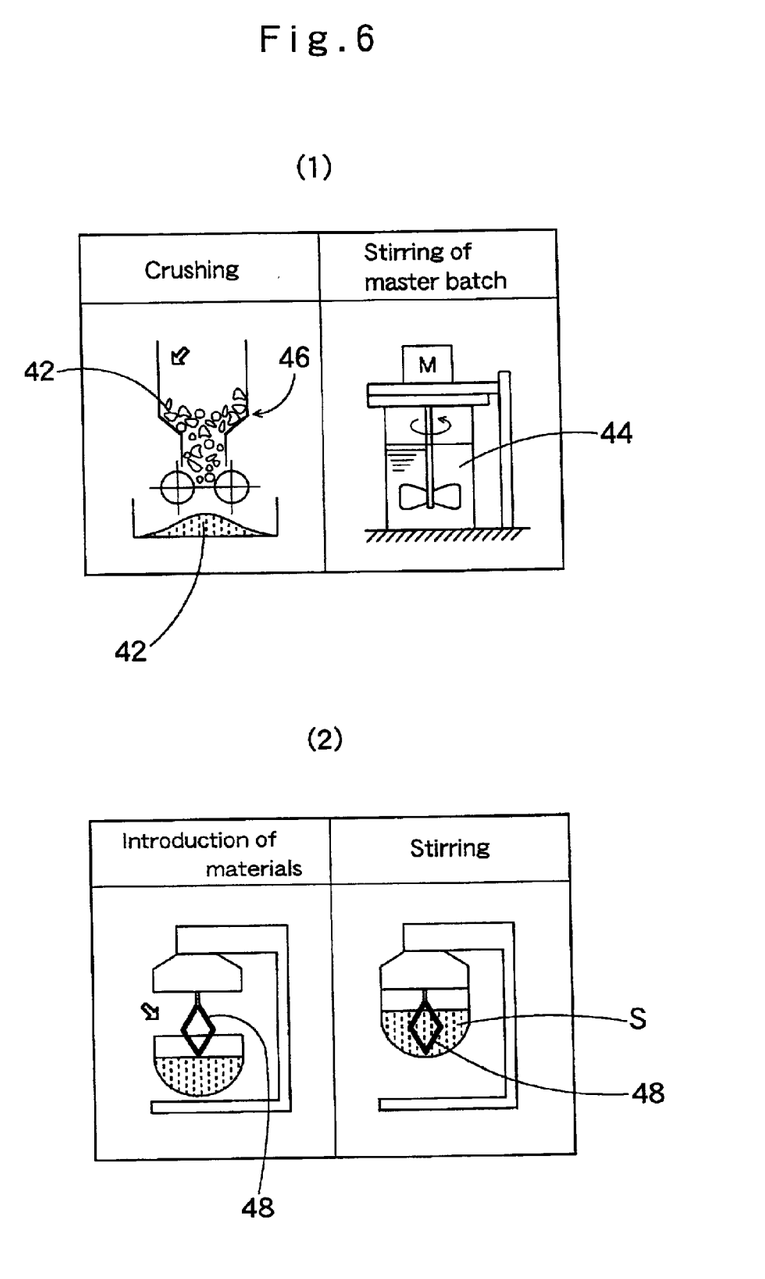
FIG. 6 is a sectional view showing an outline of one example of the process for producing the sealer of the present invention.

The sealer composition is prepared in the following manner (see FIG. 6).

(1) The resinous tackifier 42 is crushed and then subjected to dissolution and dispersion in a non-volatile plasticizer or process oil to prepare dispersing-medium master batch 44. The resinous tackifier is usually a mass with a particle diameter of 1 cm or more, and the dissolution and dispersion thereof as such is difficult or time-consuming. The size of particles thus crushed shall be 3 to 0.3 mm. The unit used for crushing includes, but is not limited to, a crusher such as roll crusher 46 exemplified in FIG. 6.

The dissolution and dispersion thereof is conducted using a conventional stirrer while the plasticizer or process oil is heated over the softening temperature (e.g. 70° C.) of the resin tackifier.

(2) Then, each liquid component is added to the thixotropic agent to prepare gel sealer S.

The stirring and mixing in this step is conducted by a stirring machine equipped with an agitating blade 48 in a planetary system (referred to hereinafter as "planetary stirrer"). Specifically, the sealer composition is produced by using stirrer 48 for high viscosity (shown in FIG. 6) attached to a stirring machine sold under the trade name "Aiko Chemical Mixer" produced by Aikosha Co., Ltd.

The stirring time shall be e.g. 20 to 40 minutes for a 200-kg batch.

C. Application of the Sealer

Using e.g. a cartridge gun for sealer, the sealer thus prepared is fit in a usual manner to the grooved bottom of a trim part in a weatherstrip, and a sheet-metal flange is inserted into the weatherstrip.

Because this sealer is free of solvent, the effect of the sealer is stable without any environmental pollution and change in physical properties caused by solvent volatilization. Further, because the sealer hardly shows stringing, sags or runs, the processability of fitting the sealer is good, and because of no or less change in viscosity, the processability of fitting of the weatherstrip (processability of inserting a flange) is also good.

The material for forming the weatherstrip is usually non-polar rubber; an ethylene α-olefin diene copolymer (EPDM), which will be swollen by a sealer having the composition according to the prior publication, whereas the sealer of the present invention will substantially not swell or shrink such materials, and even if swelling or shrinking occurs, the degree thereof is low. Accordingly, the change in the form and strength of the weatherstrip, caused by swelling/shrinkage thereof, is negligible so that the sealing characteristics of the weatherstrip are hardly deteriorated.

The non-drying sealer composition of the present invention can be applied not only to vulcanized rubber products made of EPDM, but also to rubber sealing products made of non-polar vulcanized rubber which may be swollen by liquid rubber or a tackifier in a sealer. The non-polar rubber to which the sealer composition can be applied includes natural rubber (NB), isoprene rubber (IR), butyl rubber (IIR), butadiene rubber (BR), styrene butadiene rubber (BR) etc.

To reduce the degree of swelling of the sealer to substantially 0% in the prior art, the sealer should prepared depending on the type of rubber because the degree of swelling of the sealer is varied depending on the type of rubber. However, the sealer of the present invention can be applied by changing only the ratio of the swelling component to the shrinking component in the dispersing medium without changing the fundamental formulation (composition). Regulation of the sealer viscosity is facilitated by using two or more kinds of dispersing mediums. This is because when one kind of dispersing medium is used, the amount of the dispersing medium added to reduce the degree of swelling to 0% is determined, thus making the viscosity constant.

EXAMPLES

Hereinafter, the Examples and Conventional Examples (Reference Examples), which were conducted to confirm the effect of the present invention, are described.

(1) Preparation of Sealers

The sealers in the Conventional Examples and the Examples were prepared in the following order according to the respective formulations shown in Tables 1 and 2.

TABLE 1

| | (wt %) | | |
|---|---|---|---|
| Blend materials | Reference Example | Conventional Example 1 | Conventional Example 2 |
| Sealer base | | | |
| Butyl rubber | 11 | — | — |
| Liquid NBR | — | 4.5 | ← |
| Liquid tackifier | | | |
| Polybutene | 12 | 9.5 | ← |
| Resinous tackifier | | | |
| Petroleum resin | 13 | 11 | ← |
| Dispersing medium | | | |
| DINP | — | 20 | — |
| Process oil | — | — | 20 |
| Polypropylene glycol | | | |
| Trifunctional molecular weight; 1000 | — | — | — |
| Trifunctional molecular weight; 3000 | — | — | — |
| Kerosin | 14 | | |
| Thixotropic agent | | | |
| Calcium bicarbonate | 39 | 27 | ← |
| Fine calcium carbonate particles | — | 27 | ← |
| Carbon black | 11 | 1 | ← |

TABLE 2

| | (wt %) | | | | | |
|---|---|---|---|---|---|---|
| Blend materials | Example 1 | Example 2 | Example 3 | Example 4 | Example 5 | Example 6 |
| Sealer base | | | | | | |
| Butyl rubber | — | — | — | — | — | — |
| Liquid NBR | 4.5 | ← | ← | ← | ← | ← |
| Liquid tackifier | | | | | | |
| Polybutene | 9.5 | ← | ← | ← | ← | ← |
| Resinous tackifier | | | | | | |
| Petroleum resin | 11 | ← | ← | ← | ← | ← |
| Dispersing medium | | | | | | |
| DINP | — | — | 4 | — | 3 | — |
| Process oil | — | — | — | 5 | — | 4 |

TABLE 2-continued

| Blend materials | Example 1 | Example 2 | Example 3 | Example 4 | Example 5 | Example 6 |
|---|---|---|---|---|---|---|
| Polypropylene glycol | | | | | | |
| Trifunctional molecular weight; 1000 | 20 | — | 16 | 15 | — | — |
| Trifunctional molecular weight; 3000 | — | 20 | — | — | 17 | 16 |
| Thixotropic agent | | | | | | |
| Calcium bicarbonate | 27 | ← | ← | ← | ← | ← |
| Fine calcium carbonate particles | 27 | ← | ← | ← | ← | ← |
| Carbon black | 1 | ← | ← | ← | ← | ← |

Petroleum resin (crushed material having an average particle diameter of 2 mm) and a plasticizer or process oil (dispersing medium) were charged into a bucket (20 L) and stirred for 60 minutes under heating at 80° C. to prepare a master batch of dispersing medium.

Each thixotropic agent shown was charged into a planetary stirrer ("Aiko Chemical Mixer" with a volume of 5 L) and stirred for 5 minutes at a velocity of 90 rpm, and then the master batch of dispersing medium, polybutene and liquid NBR were added thereto, stirred for 30 minutes at a velocity of 90 rpm and gelled to prepare a non-drying sealer in each example.

The sealer in the Reference Example was prepared in a similar manner to the Examples, as follows: Petroleum resin (crushed resin with an average particle diameter of 2 mm) and kerosine (dispersing medium) were charged into a bucket (20 L) and stirred for 120 minutes at room temperature to prepare a kerosine master batch. Each thixotropic agent shown in the table was charged into the above-mentioned planetary stirrer (5 L volume), stirred and mixed at a velocity of 90 rpm for 5 minutes, and the kerosine master batch, polybutene and butyl rubber were added thereto, stirred at a velocity of 90 rpm for 20 hours and gelled to prepare the sealer in the Reference Example.

(2) Non-drying sealers in the reference example, the conventional examples and the examples were tested to evaluate their performance in each of the following items.

① Viscosity

Each sample thus prepared was placed in a vessel, measured for its initial viscosity, sealed, and taken out after predetermined days, and measured for its viscosity. The measurement conditions were as follows: Viscometer used: BH rotational viscometer (Rotor, No. 7; number of revolutions, 2 rpm)

Initial viscosity (Pa·S): Determined at a temperature of 20° C.

Degree of change with time (%): Determined at a temperature of 22° C. after 20 days at 40° C.

② Sealing Properties

Figure 7:
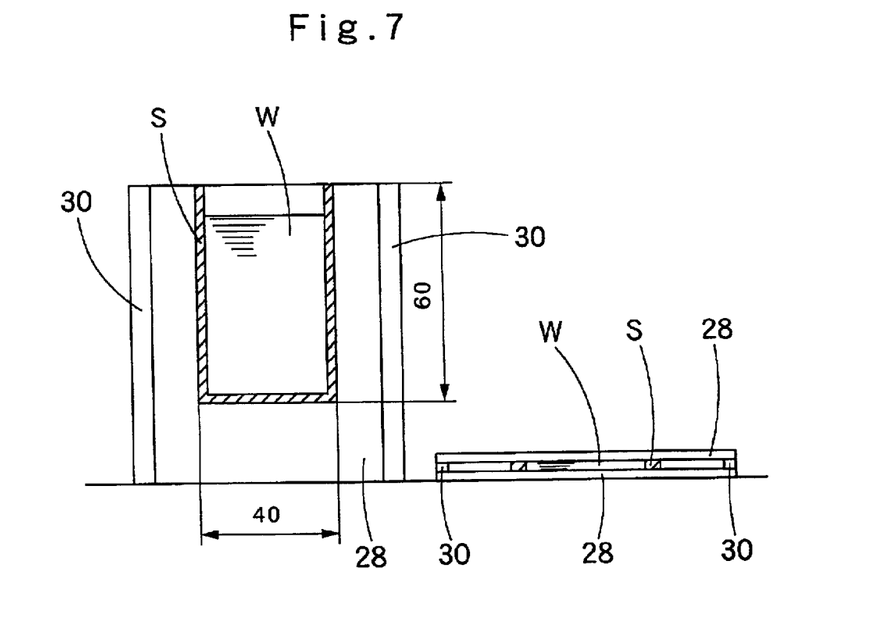
FIG. 7 is a drawing showing a test for the sealing properties of a sealer.

As shown in FIG. 7, the sealer (sample) S was applied in an approximately circular shape in section of about 5 mm in diameter onto glass plate 28, and a pair of glass plates 28 were attached to each other via 3 mm-thick spacer 30 and fixed with a clip (not shown) to prepare a test specimen. After water (W) was charged to a depth of 60 mm into the test specimen, the test specimen was stood vertically to examine the occurrence of water leakage under the following measurement conditions.

Initial stage: The sealer after 22 hours was judged on the basis of water leakage.

After aging: The sealer left at 90° C. for 10 days was judged in the same manner.

③ Sagging and Running Properties

Figure 8:
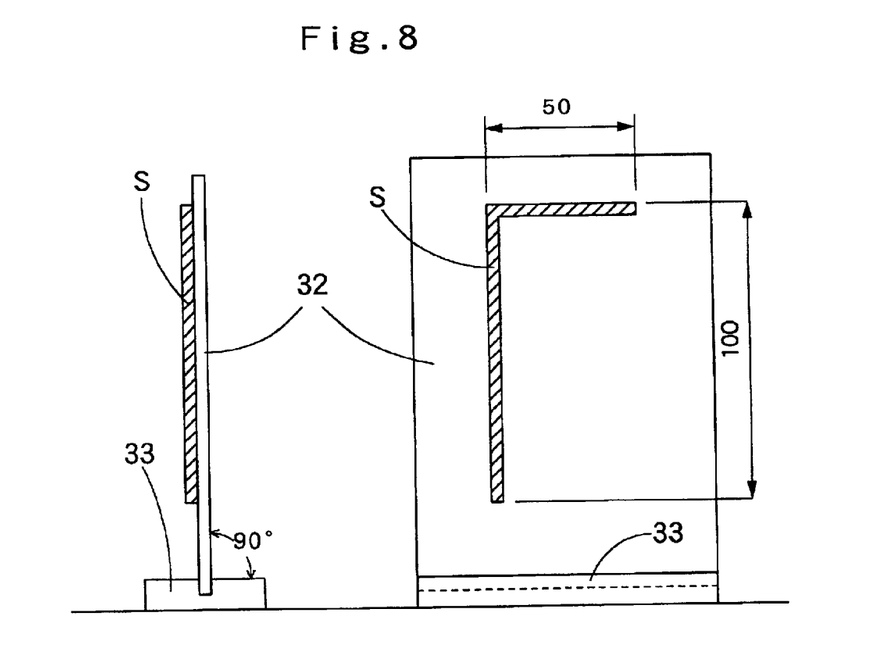
FIG. 8 is a drawing showing a test for the sagging and running properties of a sealer.

As shown in FIG. 8, sealer S was applied in a semicircular shape in section (about 5 mm width×about 2.5 mm height) onto a coated sheet metal 32, and the coated sheet metal 32 was stood with a grooved stand 33 and left under the conditions shown below, and the maximum sagging (mm) of sealer S was measured. Test conditions: The sealer was examined after being left at 50° C. for 5 days or after being left at 90° C. for 5 days.

④ Loading Upon Insertion

Figure 9:
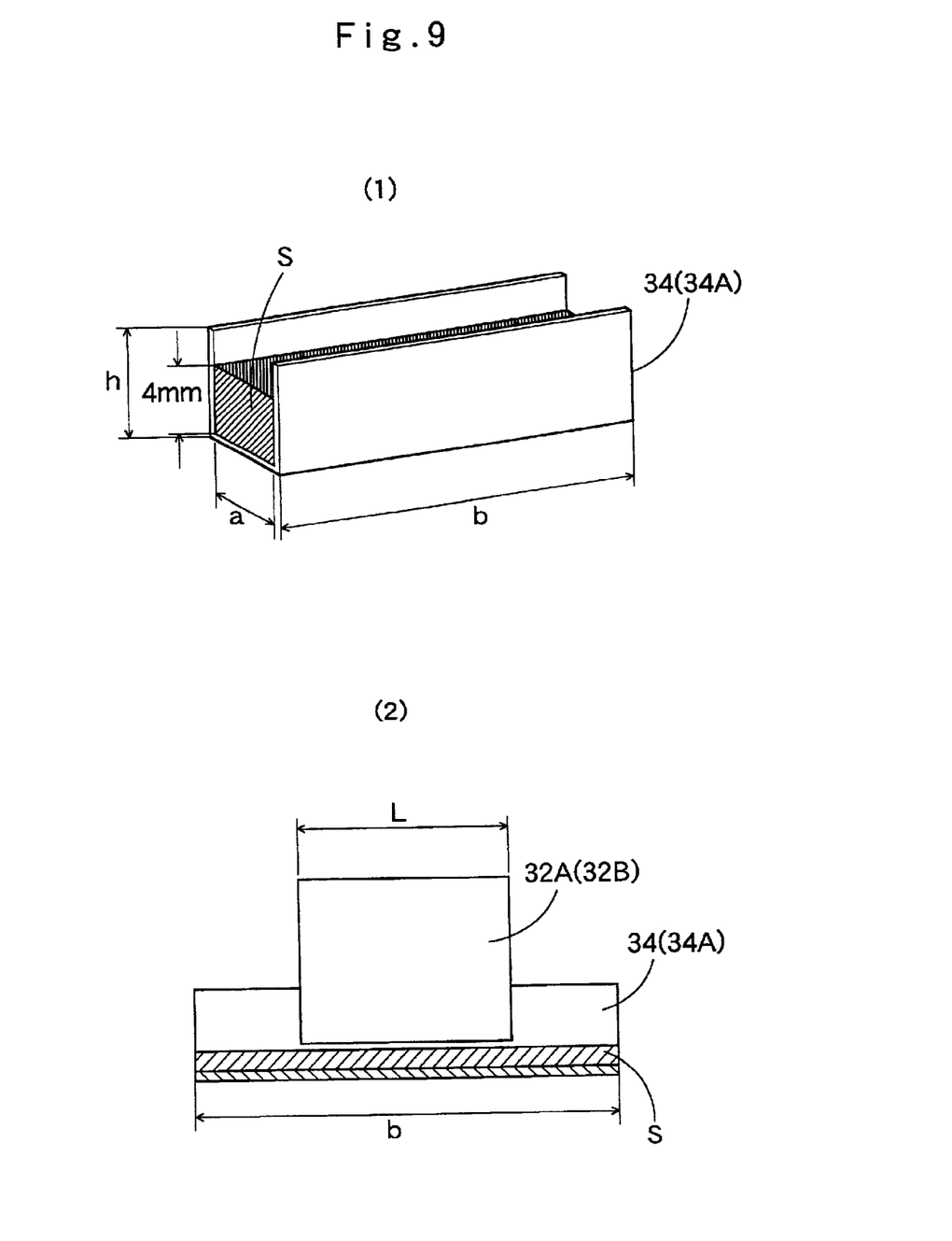
FIG. 9 is a drawing showing a test for flange insertion loading/adhesion to a sealer.

In FIG. 9, coated sheet metal 32A (L=40 mm, t=2.4 mm) was inserted at a rate of 20 mm/min. to a depth of 1 mm into sealer S previously introduced to a depth of 4 mm into channel 34 (a=13 mm, b=170 mm, h=8 mm), and the loading (unit: N/100 mm) upon this insertion was measured.

Just thereafter, the test was performed at each temperature shown, and the initial test was performed using the test specimen left at 40° C. for 5 days.

⑤ Adhesion

In FIG. 9, coated sheet metal 32B (L=100 mm, t=0.8 mm) was inserted to a depth of 4 mm at the central bottom of channel 34 A (a=5.5 mm, b=150 mm, h=9 mm), then left for 10 minutes and pulled off at a rate of 200 mm/min., and the mass (g) of the sealer adhering thereto was determined.

The initial test (conducted after the specimen was left at 40° C. for 5 days) was conducted at each temperature shown, and the post-aging test was conducted on the specimen after being left at 80° C. for 10 days.

⑥ Rust Prevention

Figure 10:
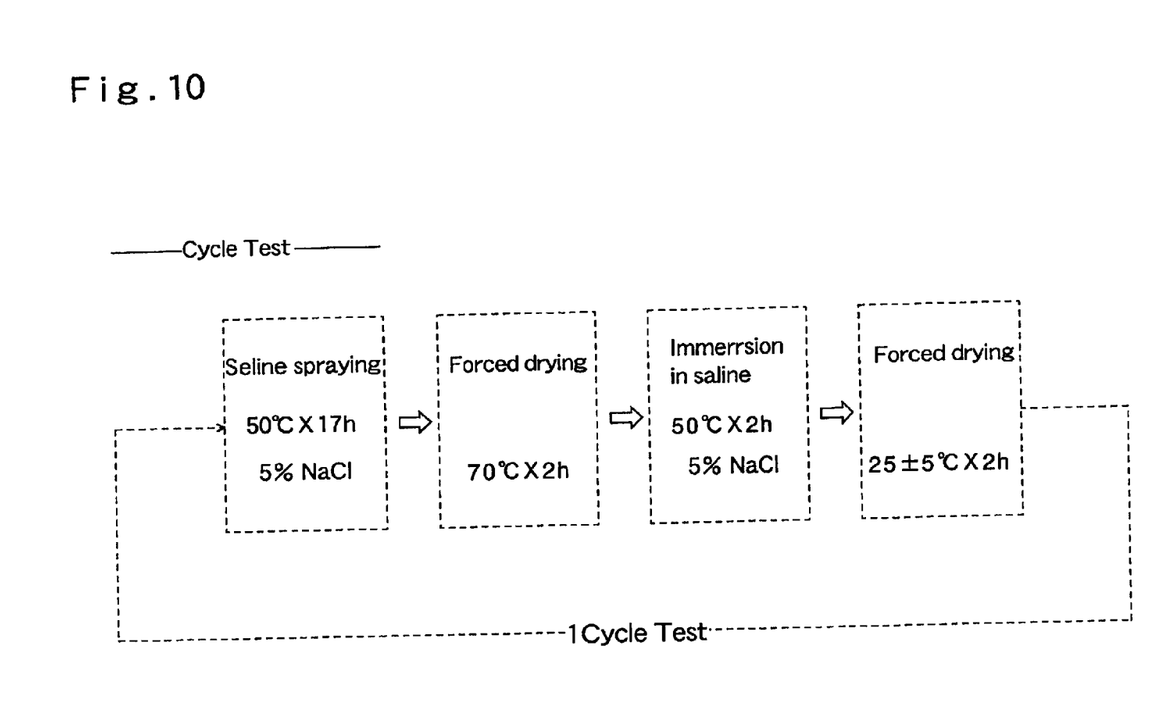
FIG. 10 is a drawing showing a cycle of promoting rust prevention in a test of rust prevention.

A coated sheet metal (150 mm×40 mm×0.8 mm thick) was cut with a cutter knife and then coated with each sealer in a semicircular shape in section (about 5 mm wide×about 2.5 mm high) to prepare a test specimen. This test specimen was subjected repeatedly to 30 cycles of treatment shown in FIG. 10, followed by removing the sealer and washing it away with a solvent (kerosine), and the state of rust on the cut part was, examined.

⑦ Stringing Properties

Figure 11:
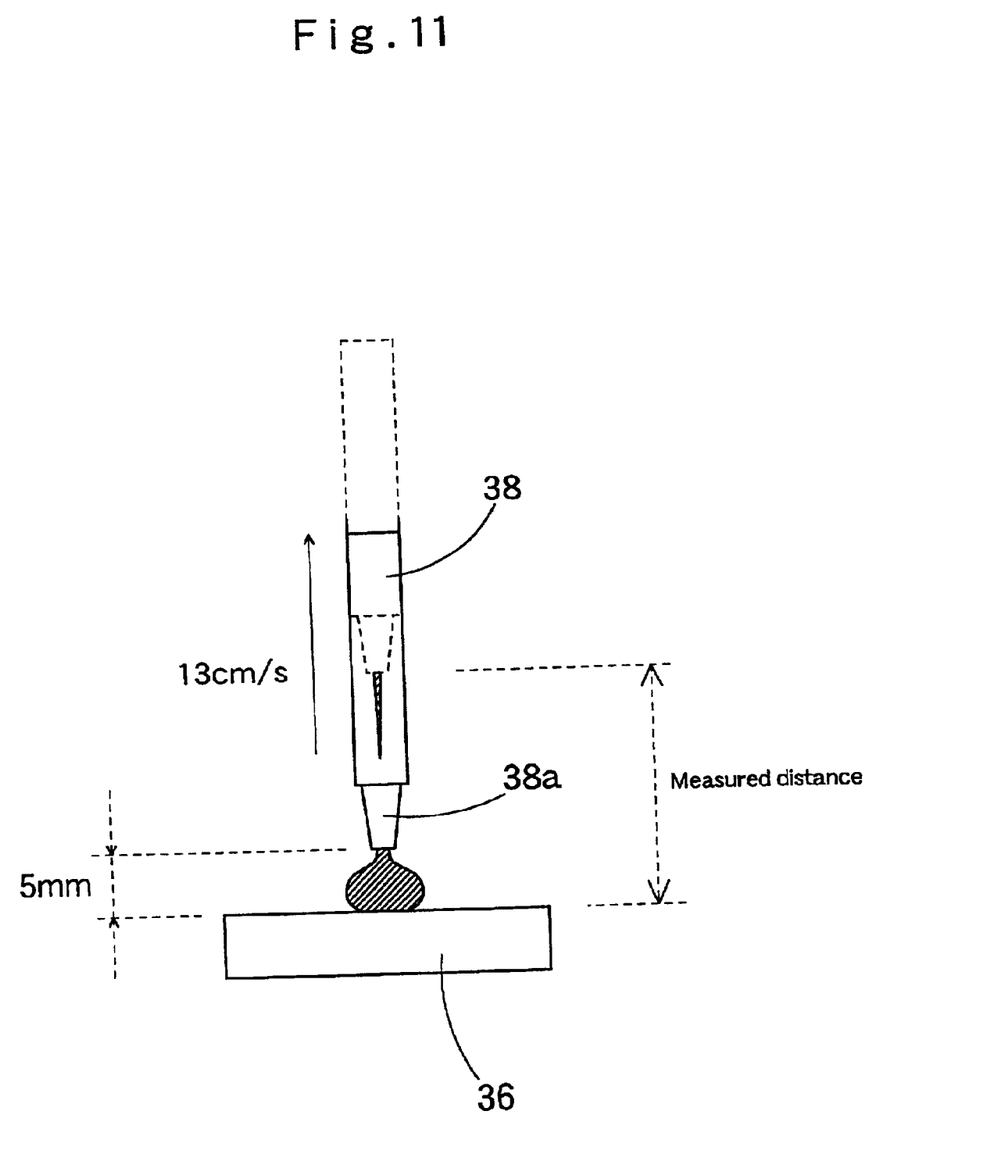
FIG. 11 is a drawing showing a test for stringing properties.

As shown in FIG. 11, about 3 g sealer S was applied in a semicircular shape in section (about 5 mm wide about 2.5 mm high) via cartridge gun 38 onto steel plate 36, and nozzle 38a was raised vertically at a rate of 13 cm/s, to determine the distance (mm) by which the nozzle 38a moved until the sample (sealer) was cut.

⑧ Rubber-swelling Properties

A weatherstrip-molding rubber material having the formulation described below the was vulcanized, extruded into a product with 25 mm wide×3 mm thick, and cut into pieces of 25 cm long to prepare test specimens of 25 mm×25 mm×3 mm thick.

| Formulation | |
|---|---|
| EPDM* | 100 wt parts |
| Carbon black | 113 wt parts |
| Process oil (paraffin type) | 58 wt parts |
| Stearic acid | 0.8 wt parts |
| Zinc white | 1.5 wt parts |
| Tackifier | 3.8 wt parts |
| White carbon | 15 wt parts |
| Sulfur | 1.2 wt parts |
| Vulcanization accelerator | 3.4 wt parts |
| Foaming agent | 0.8 wt part |

*C2 content, 46 to 50%; iodine value, 16 to 18.

Then, the test specimen was immersed in the center of a vessel (200 mL) charged with the sealer, and 24 hours later, the test specimen was removed. From the weights thereof measured in the air before and after immersion and in water before and after immersion respectively, the degree of swelling thereof (volume change) was determined according to the following equation:

Degree of swelling (%) = $\{W2+W3-(W1+W4)\} \times 100/(W1-W2)$

Wherein $W1$ and $W3$ are weights in the air before and after immersion respectively, and $W2$ and $W4$ are weights in water before and after immersion respectively.

(2) The results of the above evaluation tests are shown in Tables 3 and 4.

It can be seen that the sealers in the examples, similar to those in the conventional examples, are excellent in sealing properties and in the processability of fitting the sealers with less or no sagging and running properties and with stable loading upon insertion (particularly at the initial stage).

It can be seen also that the degrees of swelling of the rubber base in the examples (degrees of swelling in Examples 3 to 6 are 0%) are significantly lower than those of conventional example 1 (dispersing medium: process oil only) and conventional example 2 (dispersing medium: plasticizer only). In examples 1 and 2 where the dispersing medium was PPG only, the specimens shrunk, but the degrees of shrinkage thereof were as low as −3% or less (desirable degree: 0%), so that rubber deformation if any would not cause any problem.

TABLE 3

| Item | | | Reference Example | Conventional Example 1 | Conventional Example 2 |
|---|---|---|---|---|---|
| ① Degree of swelling of rubber (%) | | | 34 | 16 | 11 |
| ② Viscosity | initial stage | | 630 | 480 | 620 |
| (Pa · s) 22° C. | degree of change with time | | 6 | 0 | 0 |
| ③ Sealing properties | initial stage | | water leakage | no water leakage | no water leakage |
| | post-aging | | no water leakage | no water leakage | no water leakage |
| ④ Sagging and running properties (vertical · horizontal) (mm) | 50° C. × 5 days | | 20.18 | 0.0 | 0.0 |
| | 90° C. × 5 days | | 20.20 | 0.0 | 0.0 |
| ⑤ Loading upon insertion N/100 mm | Just after insertion | 5° C. | 0.30 | 0.19 | 0.25 |
| | | 20° C. | 0.17 | 0.15 | 0.20 |
| | | 40° C. | 0.16 | 0.15 | 0.17 |
| | initial stage | | 0.84 | 0.26 | 0.25 |
| ⑥ Adhesion (g) | initial stage | −10° C. | 0.28 | 0.90 | 0.44 |
| | | 20° C. | 0.44 | 0.55 | 0.50 |
| | | 40° C. | 0.45 | 0.65 | 0.36 |
| | initial stage | | 0.18 | 0.21 | 0.49 |
| ⑦ Rust prevention | | | no rust | no rust | no rust |
| ⑧ Stringing properties (cm) | | | 50.0 | 5.0 | 5.0 |
| ⑨ Specific gravity | | | 1.28 | 1.48 | 1.28 |

TABLE 4

| Item | | | Example 1 | Example 2 | Example 3 | Example 4 | Example 5 | Example 6 |
|---|---|---|---|---|---|---|---|---|
| ① Degree of swelling of rubber (%) | | | −2 | −3 | 0 | 0 | 0 | 0 |
| ② Viscosity | initial stage | | 400 | 450 | 430 | 440 | 440 | 450 |
| (Pa · s) 22° C. | degree of change with time | | 0 | 0 | 0 | 0 | 0 | 0 |
| ③ Sealing properties | initial stage | | no water leakage | no water leakage | no water leakage | no water leakage | no water leakage | no water leakage |
| | post-aging | | no water leakage | no water leakage | no water leakage | no water leakage | no water leakage | no water leakage |
| ④ Sagging and running properties (vertical · horizontal) (mm) | 50° C. × 5 days | | 0.0 | 0.0 | 0.0 | 0.0 | 0.0 | 0.0 |
| | 90° C. × 5 days | | 0.0 | 0.0 | 0.0 | 0.0 | 0.0 | 0.0 |
| ⑤ Loading upon insertion N/100 mm | Just after insertion | 5° C. | 0.09 | 0.10 | 0.10 | 0.09 | 0.15 | 0.11 |
| | | 20° C. | 0.07 | 0.08 | 0.06 | 0.07 | 0.10 | 0.08 |
| | | 40° C. | 0.04 | 0.04 | 0.05 | 0.04 | 0.10 | 0.05 |
| | initial stage | | 0.17 | 0.17 | 0.20 | 0.19 | 0.19 | 0.18 |

TABLE 4-continued

| Item | | | Example 1 | Example 2 | Example 3 | Example 4 | Example 5 | Example 6 |
|---|---|---|---|---|---|---|---|---|
| ⑥ Adhesion (g) | initial stage | −10° C. | 0.40 | 0.47 | 0.55 | 0.48 | 0.63 | 0.51 |
| | | 20° C. | 0.40 | 0.41 | 0.45 | 0.38 | 0.51 | 0.38 |
| | | 40° C. | 0.31 | 0.36 | 0.59 | 0.40 | 0.49 | 0.40 |
| | initial stage | | 0.26 | 0.28 | 0.25 | 0.24 | 0.22 | 0.29 |
| ⑦ Rust prevention | | | no rust | no rust | no rust | no rust | no rust | no rust |
| ⑧ Stringing properties (cm) | | | 5.0 | 5.0 | 5.0 | 5.0 | 5.0 | 5.0 |
| ⑨ Specific gravity | | | 1.39 | 1.38 | 1.40 | 1.37 | 1.39 | 1.36 |

As shown above, the non-drying sealer of the present invention is free of solvent and thus free of the problem (i.e. environmental pollution and change in physical properties) caused by solvent, and is excellent in the processability of fitting the sealer. In addition, it has sealer characteristics equal to or higher than those of a solvent-type sealer.

The degree of swelling can be made significantly lower by incorporating the shrinking component such as polyether polyol as the dispersing medium than by using the conventional swelling component only. In particular, when this sealer composition is applied to a weatherstrip having insertless trim part, the effects of the present invention increase. The swelling action of the sealer on the rubber base is negligible so that the reduction in strength caused by swelling of the trim part is minimized.

The regulation of viscosity in permitting the degree of, swelling of rubber to be 0% is facilitated by using two or more kinds of dispersing mediums and changing the ratio of the swelling component to the shrinking component to be compounded.

What is claimed is:

1. A non-drying sealer composition applied to a non-polar vulcanized rubber product, comprising:
   a liquid rubber as a sealer base, a tackifier and a thixotropic agent as auxiliary materials, and a non-volatile softener including a plasticizer as a dispersing medium;
   wherein as the non-volatile softener, a shrinking component is used alone or in combination with a swelling component, whereby the swelling action of the sealer composition against the non-polar vulcanized rubber product reaches within about ±5% in terms of the degree of swelling, and wherein the shrinking component is a polyether polyol.

2. The non-drying sealer composition according to claim 1, wherein the swelling action of the sealer composition against the non-polar vulcanized rubber product reaches within about 0% in terms of the degree of swelling.

3. The non-drying sealer composition according to claim 1, wherein the shrinking component is trifunctional polypropylene glycol.

4. The non-drying sealer composition according to claim 3, wherein the liquid rubber is liquid NBR, and the swelling component used in the non-volatile softener is a diphthalate-based plasticizer and/or process oil.

5. The non-drying sealer composition according to claim 4, wherein the thixotropic agent is calcium carbonate powder.

6. The non-drying sealer composition according to claim 3, wherein the thixotropic agent is calcium carbonate powder.

7. The non-drying sealer composition according to claim 1, wherein the liquid rubber is liquid NBR, and the swelling component used in the non-volatile softener is a diphthalate-based plasticizer and/or process oil.

8. The non-drying sealer composition according to claim 7, wherein the thixotropic agent is calcium carbonate powder.

9. The non-drying sealer composition according to claim 1, wherein the thixotropic agent is calcium carbonate powder.

10. The non-drying sealer composition according to claim 2, wherein the shrinking component is trifunctional polypropylene glycol.

* * * * *